United States Patent [19]

Aono et al.

[11] 4,083,234
[45] Apr. 11, 1978

[54] METHOD OF AND SYSTEM FOR DETECTING MISFIRE IN INTERNAL COMBUSTION ENGINE

[75] Inventors: Shigeo Aono, Tokyo; Masahara Asano, Yokosuka, both of Japan

[73] Assignee: Nissan Motor Company, Limited, Japan

[21] Appl. No.: 752,967

[22] Filed: Dec. 21, 1976

[30] Foreign Application Priority Data
Dec. 25, 1975 Japan .................................. 50-155202

[51] Int. Cl.² ............................................. G01M 15/00
[52] U.S. Cl. .......................................... 73/116; 60/277
[58] Field of Search ................. 73/116, 117.3; 60/277; 324/77 B

[56] References Cited

U.S. PATENT DOCUMENTS

| | | | |
|---|---|---|---|
| 3,872,292 | 3/1975 | Dawson, Jr. | 73/116 X |
| 3,908,366 | 9/1975 | Masaki | 73/117.3 X |
| 3,924,457 | 12/1975 | Oshima et al. | 73/116 |

*Primary Examiner*—Jerry W. Myracle
*Attorney, Agent, or Firm*—Robert E. Burns; Emmanuel J. Lobato; Bruce L. Adams

[57] ABSTRACT

A method of and a system for detecting a misfire caused in a spark-ignition internal combustion engine, characterized by producing a signal wave having a frequency variable with the frequency of exhaust noises of the engine and a signal variable with the output speed of the engine and analyzing the frequency characteristics of the signal wave on the basis of the signal representative of the engine output speed.

12 Claims, 12 Drawing Figures

FREQUENCY

METHOD OF AND SYSTEM FOR DETECTING MISFIRE IN INTERNAL COMBUSTION ENGINE

BACKGROUND OF THE INVENTION

The present invention relates to a method of and a system for detecting a misfire in a spark-ignition internal combustion engine.

Some modern automotive internal combustion engines are equipped with catalytic converters for re-oxidizing combustible residues in the exhaust gases discharged from the power cylinders of the engines. The catalysts incorporated in the converters are thus heated to considerably high temperatures throughout the operation of the engines and, for this reason, one of the most important design considerations in using such converters is to protect the catalysts from the attacks of heat. The temperatures in the exhaust gases rise to extremely high levels when misfires take place in the power cylinders of the engines and sometimes result in burning of the catalysts. Measures must therefore be taken to detect misfiring conditions of the engines and to eliminate the causes inviting the misfires in the engine cylinders. Various methods have thus far been proposed to detect the misfiring conditions of automotive internal combustion engines for the purpose of protecting the catalytic converters from the heat resulting from misfires in the engines.

One of such methods is to monitor the waveform of the current in the primary or secondary winding of the ignition coil provided in the spark ignition system of an engine. Such a method is, however, not fully acceptable because of the fact that a misfire in a spark-ignition internal combustion engine can be invited not only due to malfunction of the ignition system but by reason of an improperly proportioned air-fuel mixture delivered to the power cylinders of the engine.

Another prior-art method of detecting a misfire in an internal combustion engine is to measure the temperatures of the exhaust gases discharged from the individual power cylinders of the engine and to compare the detected exhaust gas temperatures with each other for detecting an unusual temperature level resulting from a misfiring condition. This method involves a drawback in that extremely complicated and costly mechanical and electrical arrangements are required to achieve satisfactory reliability.

A third method of detecting a misfiring condition is to monitor the concentration of air in the exhaust gases discharged from the engine cylinders for detecting failure of combustion in any of the cylinders from an unusual increase in the concentration of air in the exhaust gases containing an air-fuel mixture which has not been fired and combusted. The concentration of air in the exhaust gases is detected by the use of an oxygen sensor which is mounted within the exhaust system for producing an electrical output signal which varies with the concentration of air in the exhaust gases passed through the sensor. As is well known in the art, such as from U.S. Pat. No. 3,827,237, the output signal of such an oxygen sensor is substantially constant except when the concentration of oxygen contained in the exhaust gases assumes a certain value (which usually corresponds to the stoichiometric air-to-fuel ratio of the mixture produced in the mixture supply system of an engine). The oxygen sensor is thus unable to continuously and faithfully follow the variation in the concentration of air in the exhaust gases in an analog fashion and, for this reason, can not distinguish a condition in which a misfire has been brought about in the engine from a condition in which an overlean mixture has been combusted in the engine.

SUMMARY OF THE INVENTION

The present invention contemplates provision of a new and novel method of and a system for detecting a misfire in a spark-ignition internal combustion engine without recourse to any of the expedients which have been conventionally proposed.

In accordance with one important aspect of the present invention, there is provided a method of detecting a misfiring condition of a spark-ignition internal combustion engine, comprising sensing the exhaust noises of the engine for producing a continuous signal wave having an exhaust-noise frequency which is variable with the detected exhaust noises. The signal wave has a frequency spectrum having peak values one of which appears at a fundamental frequency component of the wave irrespective of the firing condition in the engine and the others of which appear at certain fractional harmonics of the fundamental frequency component when a misfire takes place in the engine. The output speed of the engine is detected for producing an engine-speed signal which is variable with the detected engine output speed, and the aforesaid signal wave is analyzed in respect of the fundamental frequency component of the wave and the fractional harmonics thereof on the basis of the aforesaid engine-speed signal for detecting misfiring condition, if any, of the engine from the relationship between the respective spectrum amplitudes of the frequency spectrum of the signal wave at the fundamental frequency component and the fractional harmonics thereof. The signal wave is preferably analyzed by extracting from the signal wave a fundamental frequency band having a center frequency at the above mentioned fundamental frequency component and low-frequency bands having respective center frequencies at the above mentioned fractional harmonics, varying the respective center frequencies of all the bands in accordance with the engine-speed signal. The respective spectrum density levels of low-frequency bands are monitored with respect to the spectrum density level of the fundamental frequency band. In this instance, the respective low-frequency bands may be monitored with respect to the fundamental frequency band by producing signal waves one of which has the fundamental frequency band and the others of which respectively have the low-frequency bands. The signal waves having the low-frequency bands are combined together for producing a single composite signal wave and the spectrum desity level of the composite signal wave is compared with the spectrum density level of the signal wave having the fundamental frequency band for producing a misfire signal when the former is greater than the latter. As an alternative, the low-frequency bands may be monitored with respect to the fundamental frequency band by producing a white noise signal wave having a frequency spectrum with a fixed amplitude, producing predetermined basic frequency bands from the white noise signal wave in a number equal to the total number of the above mentioned fundamental frequency band and the low-frequency bands, the basic frequency bands respectively having predetermined harmonic center frequencies, producing as the aforesaid engine-speed signal a signal wave having a variable frequency synchronized with the firing frequency in the engine, producing a fractional signal wave having a variable frequency which is equal to a predetermined fraction of the frequency of the engine-speed signal, modifying the respective center frequencies of the basic frequency bands in accordance with the frequency of the fractional signal wave for producing the aforesaid fundamental frequency band and the low-frequency bands respectively from the basic bands, producing signal waves consisting of only those frequency components of the first named signal wave which falls within the fundamental frequency band and the low-frequency bands, combining the waves having the fundamental frequency band and the low-frequency bands for producing a single composite signal wave, and extracting from the composite signal wave those frequency components which are lower than a predetermined limit lower than the lower limit of the fundamental frequency band for producing a misfire signal from the extracted frequency components. Still alternatively, the respective low-frequency bands may be monitored with respect to the fundamental frequency band by dividing the original signal wave into a predetermined number of component waves having different frequency bands, and successively scanning the component waves in cycles having periods of time each equal to the product of the number of the power cylinders of the engine and the period of time of each firing cycle of the engine for extracting only those frequency components of the original signal wave which are lower than the above mentioned fundamental frequency band and producing a misfire signal from the extracted frequency components.

In accordance with another important aspect of the present invention, there is provided a misfire detecting system for a spark-ignition internal combustion engine, comprising an electroacoustic transducer for sensing the exhaust noises of the engine and producing a continuous signal wave having an exhaust-noise frequency which is variable with the detected exhaust noises, the signal wave having a frequency spectrum having peak values one of which appears at a fundamental frequency component of the wave irrespective of firing conditions in the engine and the other of which appear at certain fractional harmonics of the fundamental frequency component when a misfire takes place in the engine, engine-speed detecting means for detecting the output speed of the engine and producing an engine-speed signal which is variable with the detected output speed of the engine, and frequency analyzing means for analyzing the above mentioned signal wave in respect of the fundamental frequency component of the wave and the fractional harmonics thereof on the basis of the aforesaid engine speed signal for thereby detecting misfiring condition, if any, of the engine from the relationship between the respective amplitudes of the frequency spectrum of the signal wave at the fundamental frequency component and the fractional harmonics thereof. In this instance the frequency analyzing means is preferably arranged in such a manner that the signal wave is analyzed by extracting from the signal wave a fundamental frequency band having a center frequency at the aforesaid fundamental frequency component and low-frequency bands having respective center frequencies at the aforesaid fractional harmonics, varying the respective center frequencies of all the bands in accordance with the engine-speed signal, and monitoring the respective spectrum density levels of the low-frequency bands with respect to the spectrum density level of the fundamental frequency band.

BRIEF DESCRIPTION OF THE DRAWINGS

The features and advantages of the method and system according to the present invention will be more clearly understood from the following description taken in conjunction with the accompanying drawings, in which.

DESCRIPTION OF THE PREFERRED EMBODIMENTS

Figure 1:
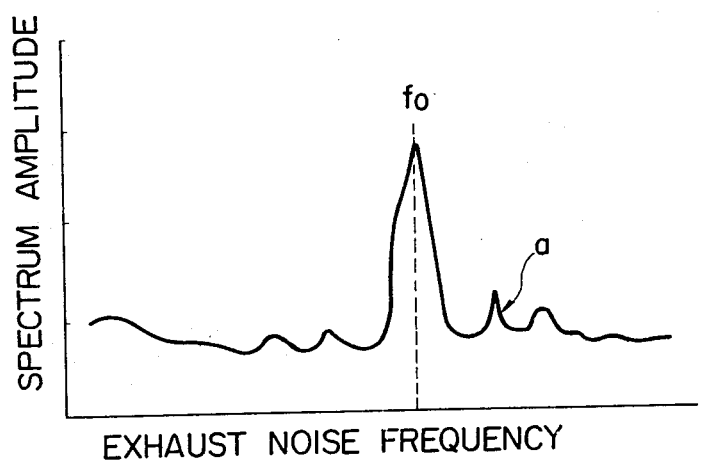
FIG. 1 is a graph showing an example of a frequency spectrum of exhaust noises of a four-cylinder internal combustion engine in normal operating condition.
Figure 2:
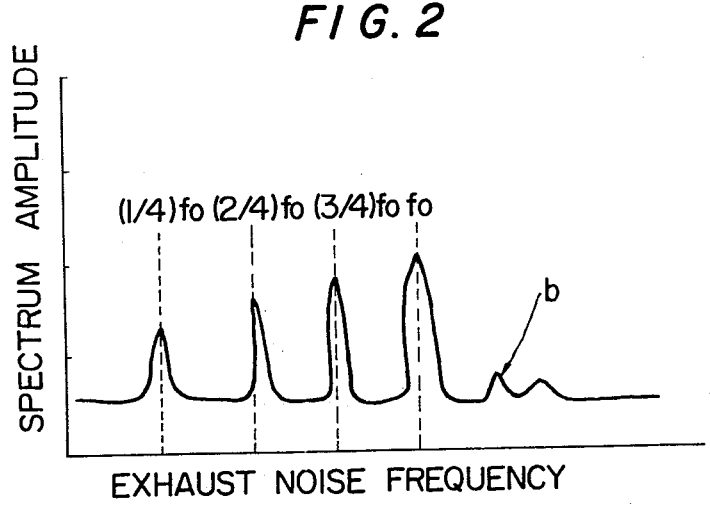
FIG. 2 is a graph similar to the graph of FIG. 1 but shows an example of a frequency spectrum of exhaust noised of the internal combustion engine having one of its power cylinders in misfiring condition.

Referring to FIG. 1 of the drawings, curve $a$ indicates an example of the frequency spectrum of the exhaust noises produced by an ordinary four-cylinder spark-ignition internal combustion engine when the engine is operating in normal conditions in which misfiring is produced in none of the power cylinders of the engine. Under these conditions of the engine, the spectrum density level of the exhaust noises has a peak value at a certain fundamental harmonic component of the wave as indicated by $f_o$. In the description to follow, the particular frequency $f_o$ will be referred to as normal-ignition exhaust noise frequency. Turning to FIG. 2, there is illustrated a curve $b$ which demonstrates an example of the wave indicative of the frequency spectrum of the exhaust noises which are produced from the same internal combustion engine when a misfire takes place in one of the power cylinders of the engine. As will be clearly seen from the curve $b$, the spectrum density level of the exhaust noises produced when a misfire is invited in the engine has not only a peak value at the frequency $f_o$ but has peak values at the three-fourth, two-fourth and one-fourth fractional harmonics of the frequency $f_o$ as indicated at $(3/4)f_o$, $(2/4)f_o$ and $(1/4)f_o$, respectively. The normal-ignition exhaust noise frequency $f_o$ and accordingly the subharmonics thereof are intrinsic of an individual internal combustion engine and vary with the output speed of the engine, viz., with the revolution speed of the crankshaft of the engine. Furthermore, the two-fourth fractional harmonic $(2/4)f_o$ corresponds to the revolution speed of the crankshaft of the engine having four power cylinders. In the case of a six-cylinder internal combustion engine, the spectrum density level of the exhaust noises produced when one of the power cylinders of the engine misfires has peak values at the intrinsic fundamental harmonic component of the exhaust noise wave of the engine and at the five-sixth to one-sixth fractional harmonics of the particular frequency component.

Figure 3:
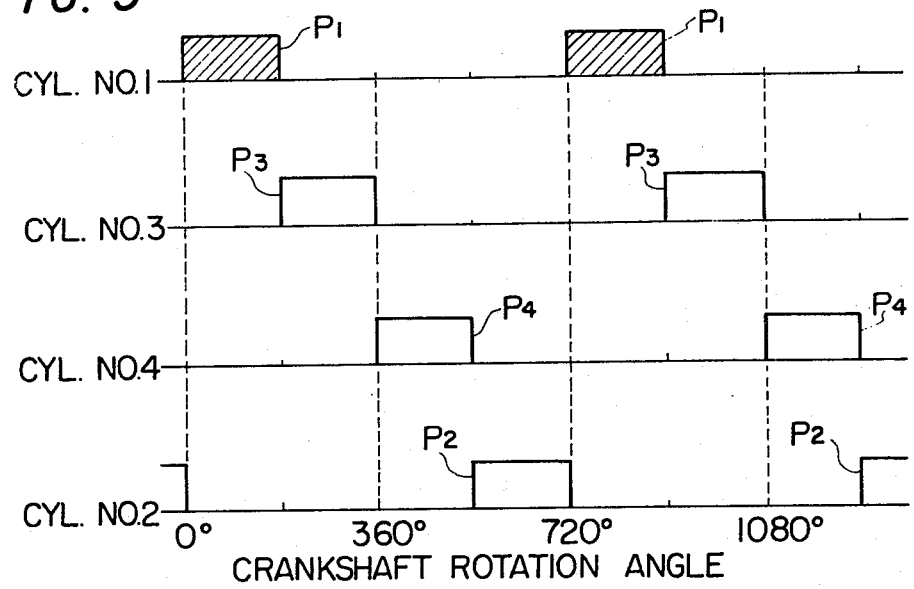
FIG. 3 is a graphic representation of power strokes, in terms of engine crankshaft rotation angle, of the power cylinders of a four-stroke cycle, four-cylinder internal combustion engine.

Assuming, in this instance, that a four-cylinder, four-stroke cycle internal combustion engine is arranged to operate in such a manner that each of the power cylinders of the engine completes each cycle of operation thereof every time the crankshaft of the engine makes two full turns about its axis, the individual power cylinders deliver power outputs during their respective power strokes which are diagrammatically indicated by $P_1$, $P_2$, $P_3$ and $P_4$ in FIG. 3 for the respective power cylinders which are denoted by Nos. 1, 2, 3 and 4. In the illustration of FIG. 3, it is further assumed, by way of example, that the firing order for the power cylinders Nos. 1 to 4 is 1-3-4-2 in respect of the numbers allocated to the individual cylinders and that the power stroke in each cycle of operation of each of the power cylinders occurs during a period of time corresponding to the crankshaft rotation angle of 180° with the remaining strokes of each cycle, viz., the intake, compression and exhaust strokes completed during the remaining period of time corresponding to the crankshaft rotation angle of 540°. If misfires happen to be produced in successive cycles of operation of one of the power cylinders such as for example the cylinder No. 1 as indicated by $P_1$, the misfires can be considered as being tantamount to negative incentives which are cyclically given to the power output performances of the other power cylinders which are operating in normal conditions. The production of the fractional harmonic components in the frequency spectrum of the exhaust noises resulting from misfires can be accounted for by the negative incentives which are thus given from the misfiring power cylinder to the remaining normally operating power cylinders. Experiments have revealed that the fractional harmonic components are produced whichsoever cylinder may happen to misfire and even when misfires are produced irregularly in any one of the cylinders or regularly or irregularly in two or more of the cylinders.

Figure 4:
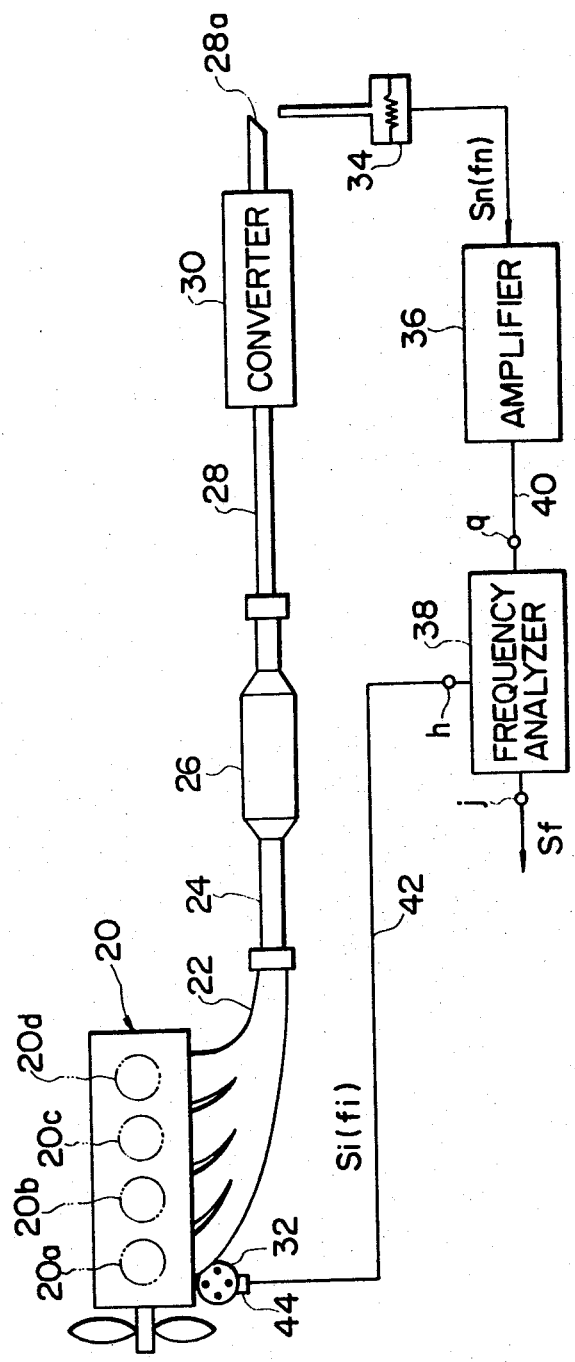
FIG. 4 is a schematic view showing a preferred embodiment of the misfire detecting system according to the present invention and the exhaust system of a four-cylinder internal combustion engine incorporating the misfire detecting system.

FIG. 4 schematically illustrates an exhaust system of an internal combustion engine and a general arrangement of a misfire detecting system embodying the present invention. The internal combustion engine, designated in its entirety by reference numeral 20, is assumed solely by way of example to be of a four-cylinder design having power cylinders 20a, 20b, 20c and 20d. The exhaust system of the engine 20 is shown including an exhaust manifold 22 leading from the respective exhaust ports (not shown) of these power cylinders, an exhaust tube 24 connected to the terminal end of the exhaust manifold 22, a muffler 26 mounted in the exhaust tube 24, and an exhaust tail pipe 28 extending from the terminal end of the exhaust tube 24 and having an open terminal end 28a, as is customary. The exhaust system is provided with an exhaust-gas cleaning converter 30 including an oxidation-type catalyst (not shown) for re-oxidizing combustible residues in the exhaust gases passed through the converter 30. If desired, the exhaust cleaning converter 30 may be located in the exhaust tube 24 or in the exhaust manifold 22. The engine 20 further includes an ignition system for firing combustible charges inducted into the individual power cylinders 20a, 20b, 20c and 20d in a predetermined sequence and at a frequency which is controlled by an ignition distributor 32 forming part of the ignition system. The exhaust and ignition systems of an outomotive vehicle are well known per se and, for this purpose, details of such systems are not herein described and shown.

The misfire detecting system embodying the present invention is provided in conjuction with the exhaust and ignition systems largely constructed and arranged as briefly described above and comprises an earphone receiver 34 as an electroacoustic transducer which is adapted to continuously convert variation of the sound pressure applied to the transducer into variation in a suitable electrical quantity such as a current for example. The earphone receiver 34 is located in the vicinity of the open terminal end 28a of the exhaust tail pipe 28 as shown and is operative to continuously produce an electrical signal wave $Sn$ having a frequency $f_n$ which varies with the frequency of the sound wave of the exhaust noises sensed by the earphone receiver 34 when the engine 20 is in operation. The variable frequency $f_n$ of the signal wave thus produced by the earphone 34 will be hereinafter referred to as the exhaust-noise frequency. If desired, the earpnone receiver 34 may be located elsewhere in the neighborhood of the exhaust system provided the exhaust noises produced in the exhaust system can be accurately sensed by the earphone receiver 34.

The signal wave $Sn$ thus produced by the earphone receiver 34 is passed through an amplifier 36 to one input terminal $g$ of a frequency analyzer 38 connected to the amplifier 36 by a line 40. The frequency analyzer 38 has another input terminal $h$ which is electrically connected by a line 42 to an engine-speed responsive frequency generator 44 which is adapted to produce a frequency variable with the output speed of the engine 20. The frequency generator 44 is herein shown connected to the previously described distributor 32 of the ignition system of the engine so that a signal wave $Si$ having a variable frequency $f_i$ which is synchronized with the frequency of the impulses produced in the secondary winding of the ignition coil (not shown) and which is accordingly representative of the revolution speed of the engine crankshaft (not shown). The frequency $f_i$ of the signal wave $Si$ thus transmitted from the ignition distributor 32 to the frequency analyzer 38 will be hereinafter referred to as the ignition-synchronized frequency. The frequency analyzer 38 is adapted to monitor the variation in the exhaust noise frequency $f_n$ of the signal wave transmitted from the earphone receiver 34 and to detect a misfire, if any, in any of the power cylinders 20a, 20b, 20c and 20d of the engine 20 on the basis of criteria which are continuously variable with the revolution speed of the engine crankshaft as represented by the ignition synchronized frequency $f_i$, as will be more clearly understood as the description proceeds. When the frequency analyzer 38 detects a misfiring condition of the engine 20, the analyzer 38 delivers an output signal Sf from its output terminal j as a misfire signal. The output terminal j of the frequency analyzer 38 is connected to a suitable control circuit (not shown) which is operative to remedy the operating conditions of the mixture supply system and/or the ignition system of the engine responsible for misfiring condition that may be produced in the engine cylinders.

Figure 6:
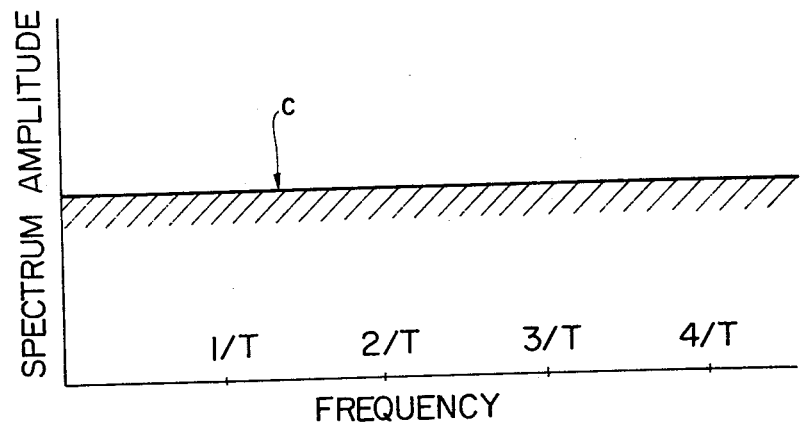
FIG. 6 is a graph showing an example of the frequency spectrum of a white noise.

Referring to FIG. 6, the frequency analyzer 38 to achieve the above described general functions is shown comprising first, second, third and fourth band-pass filters 46a, 46b, 46c and 46d which have respective first input terminals connected in parallel to one input terminal g of the frequency analyzer 38 and respective second input terminals connected in parallel to the other input terminal h of the analyzer 38. Each of the band-pass filters 46a, 46b, 46c and 46d is thus adapted to be constantly supplied with the signal wave Sn having the exhaust-noise frequency $f_n$ from the earphone receiver 34 and the signal wave Si having the ignition-synchronized frequency $f_i$ from the engine-speed responsive frequency generator 44. The first band-pass filter 46a has a transmission band having a center frequency equal to the normal-ignition exhaust noise frequency $f_n$ and passes only frequencies within the particular band width, thereby producing an output signal wave Sa having those frequency components of the exhaust-noise frequency $f_n$ which fall within the band width of the filter 46a. The second, third and fourth band-pass filters 46b, 46c and 46d have transmission bands having respective center frequencies which are equal to the three-fourth, two-fourth and one-fourth fractional harmonics $(3/4)f_o$, $(2/4)f_o$ and $(1/4)f_o$, respectively, of the normal-ignition exhaust noise frequency $f_o$, each passing only frequencies within the particular transmission band width of the filter. The second, third and fourth band-pass filters 46b, 46c and 46d thus deliver output signal waves Sb, Sc and Sd respectively, having those frequency components of the exhaust-noise frequency $f_n$ which fall within the respective transmission band widths of the filters 46b, 46c and 46d. The normal-ignition exhaust noise frequency $f_o$ and accordingly the fractional harmonics $(3/4)f_o$, $(2/4)f_o$ and $(1/4)f_o$ thereof are variables which are functions of the revolution speed of the engine crankshaft (not shown) as previously noted. The ignition-synchronized frequency $f_i$ of the signal wave Si fed to each of the band-pass filters 46a, 46b, 46c and 46d from the engine-speed responsive frequency generator 44 is used to modify the center frequency of each band-pass filter in accordance with the variation in the revolution speed of the crankshaft of the engine in operation.

The first band-pass filter 46a has an output terminal connected to a first input terminal of a two-input comparator 48, while the second, third and fourth band-pass filters 46b, 46c and 46d have respective output terminals connected in parallel to a three-input mixer 50. The mixer 50 is adapted to combine the three output signal waves Sb, Sc and Sd from the band-pass filters 46b, 46c and 46d, respectively, and produce a composite signal wave Sm consisting of only those frequency components of the exhaust-noise frequency $f_n$ which have been passed through the filters 46b, 46c and 46d. The mixer 50 has an output terminal connected to a second input terminal of the comparator 48. The comparator 48 is operative to compare the signal wave Sa from the first band-pass filter 46a with the signal wave Sm from the mixer 50 in respect of the spectrum amplitude or, in other words, the spectrum density level and delivers the previouly mentioned misfire signal Sf to the output terminal j of the frequency analyzer 38 when the signal wave Sm is greater in spectrum amplitude than the signal wave Sa.

In the absence of a misfire in all of the power cylinders 20a, 20b, 20c and 20d of the engine 20 (FIG. 4), the proportion in spectrum density of the frequency components of the exhaust-noise frequency $f_n$ which are passed through the second, third and fourth band-pass filters 46b, 46c and 46d to the frequency components of the exhaust-noise frequency $f_n$ which are passed through the first band-pass filter 46a is relatively low and as a consequence the signal wave Sa fed from the first band-pass filter 46a to the comparator 48 is greater in spectrum amplitude than the signal wave Sm fed from the mixer 50 to the comparator 48, the comparator 48 being therefore inoperative to produce the output signal S. When at least one of the power cylinders 20a, 20b, 20c and 20d of the engine 20 (FIG. 4) happens to misfire, then the proportion in spectrum density of the frequency components of the exhaust-noise frequency $f_n$ which are passed through the second, third and fourth band-pass filters 46b, 46c and 46d to the frequency components of the exhaust-noise frequency $f_n$ which are passed through the first band-pass filter 46a is increased as will be understood from comparison between the curves a and b in FIGS. 1 and 2. The signal wave Sm becomes greater in spectrum amplitude than the signal wave Sa so that the comparator 48 delivers the output signal Sp at the output terminal j of the frequency analyzer 38 as described above.

Figure 5:
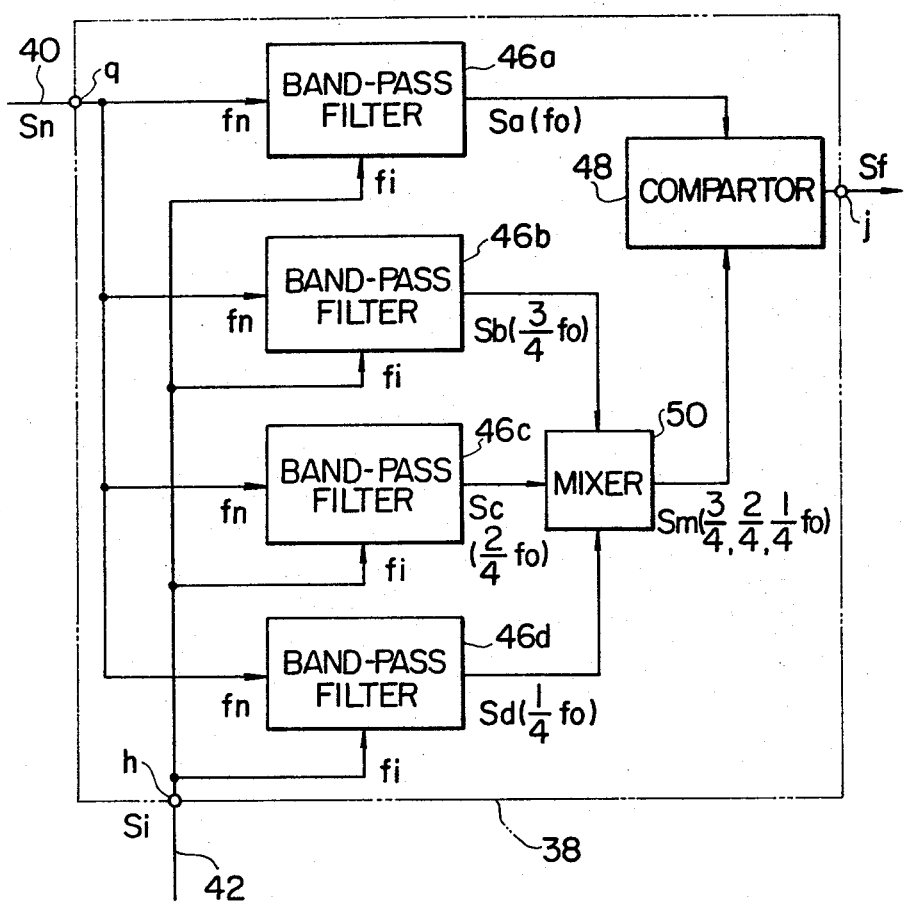
FIG. 5 is a block diagram showing a preferred example of the frequency analizing means forming part of the misfire detecting system illustrated in FIG. 4.

In the circuit arrangement illustrated in FIG. 5, the band-pass filters have been assumed to be four in number so as to suit the internal combustion engine having four power cylinders 20a, 20b, 20c and 20d as illustrated in FIG. 4. It will, however, be apparent that, if the engine is of a six-cylinder type, the frequency analyzer of the general nature above described comprises six band-pass filters one of which has a transmission band centered at the normal-ignition exhaust noise frequency $f_o$ peculiar to the engine and the others of which have transmission bands respectively centered at the fractional harmonics $(5/6)f_o$, $(4/6)f_o$, $(3/6)f_o$, $(2/6)f_o$ of the normal-ignition exhaust noise frequency $f_o$. In general, the frequency analyzer of a misfire detecting system for use with an internal combustion engine having an $n$ number of power cylinders comprises an $n$ number of band-pass filters one of which has a transmission band having a center frequency equal to the intrinsic normal-ignition exhaust noise frequency $f_o$ of the particular engine and the other of which have transmission bands having respective center frequencies equal to all the fractional harmonics of such a frequency $f_o$ that have the number $n$ as their denominators.

Figure 8:
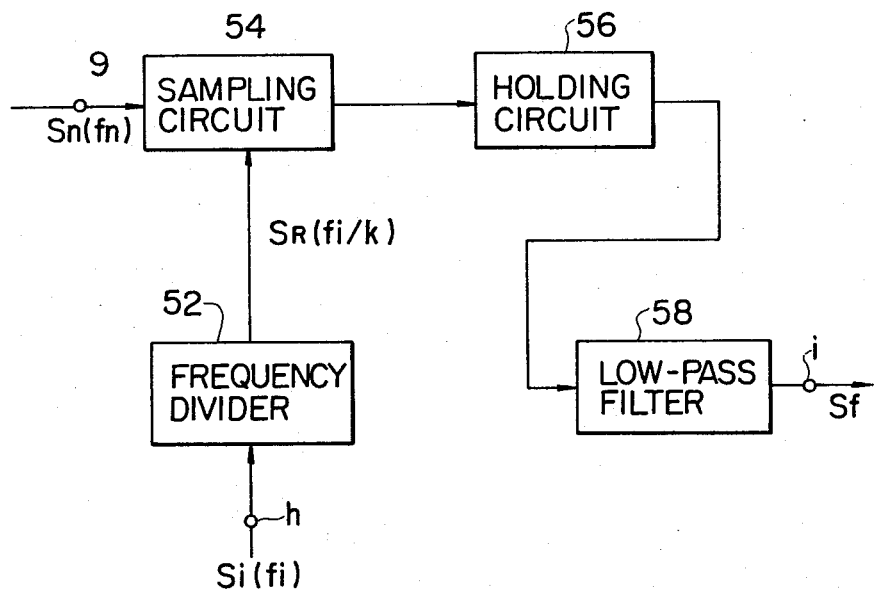
FIG. 8 is a block diagram schematically showing another preferred example of the frequency analyzing means forming part of the misfire detecting system illustrated in FIG. 4.
Figure 7:
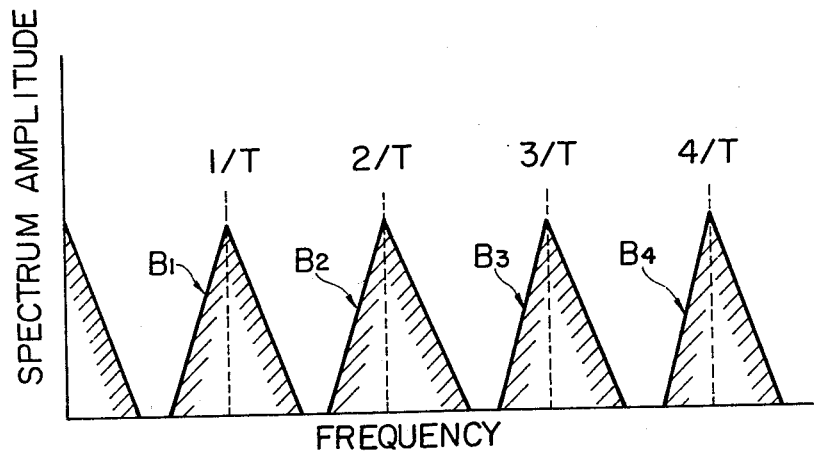
FIG. 7 is a graph showing a series of frequency bands which are obtained from the white noise illustrated in FIG. 6 in a known manner.

FIG. 6 illustrates a plot c indicating a frequency dependency of a white noise which has a flat frequency spectrum throughout the entire frequency range of interest. From the white noise of this nature, a series of discrete frequency bands $B_1$, $B_2$, $B_3$, $B_4$, . . . having respective center frequencies 1/T, 2/T, 3/T, 4/T, . . . can be obtained as indicated in FIG. 7 when such a noise is processed in a suitable manner as is well known in the art. If, in this instance, the previously mentioned ignition-synchronized frequency $f_i$ is divided by a certain divisor K so that the resultant value $f_o/k$ corresponds to a cycle having a period $k \cdot Ti$ wherein $Ti$ is the duration of each of the cycles in which the ignition system produces firing impulses in the secondary winding of the ignition coil and if the value $k \cdot Ti$ is substituted for the denominator T in each of the above mentioned center frequencies 1/T, 2/T, 3/T, 4/T, ..., then the respective center frequencies can be written as $1/k \cdot Ti$, $2/k \cdot Ti$, $3/k \cdot Ti$, $4/k \cdot Ti$, ... as will be readily understood. If, therefore, the value of the divisor $k$ is suitably selected in consideration of the ratio between the frequencies $f_o$ and $f_i$, the above described frequency conponents $f_o$, (¾)$f_o$, (2/4)$f_o$ and (¼)$f_o$ can be represented by the values of $4/k \cdot Ti$, $3/k \cdot Ti$, $2/k \cdot Ti$ and $1/k \cdot Ti$, respectively, and can accordingly be easily and accurately varied with the output speed of the engine which is represented by the ignition-synchronized frequency $1/Ti$. FIG. 8 schematically shows an example of the frequency analizer adapted to realize such a fundamental concept in the misfire detecting system illustrated in FIG. 4.

Referring to FIG. 8, the signal wave $Si$ having the ignition-synchronized frequency $f_i$ continuosuly supplied from the engine-speed responsive frequency generator 44 shown in FIG. 4 is fed to a frequency divider 52 which is operative to divide the input frequency $f_i$ by a suitable divisor $k$ and delivers an output signal wave $Sk$ having a frequency $f_i/k$. The signal wave $Sk$ is impressed on one input terminal of a sampling circuit 54 which has another input terminal connected to the earphone receiver 34 shown in FIG. 4 for being constantly supplied with the signal wave $Sn$ having the exhaust-noise frequency $f_n$. The sampling circuit 54 has incorporated therein band-pass filters (not shown) which are equal in number to the power cylinders of the internal combustion engine to incorporate the misfire detecting system under consideration and which have variable transmission bands obtained from a white noise of the nature previously described with reference to FIG. 6. The transmission bands set up in the sampling circuit 54 have respective center frequencies which are equal to the integral multiples of the frequency $f_i/k$ of the signal wave $Sk$ supplied from the frequency divider 52. If the embodiment of FIG. 8 is to be applied to an internal combustion engine having four power cylinders, the sampling circuit 54 thus passes only those frequencies which fall within the band widths having respective center frequencies represented by $f_i/k$, $2f_i/k$, $3f_i/k$ and $4f_i/k$, respectively. In this instance, the value of $k$ is selected in such a manner that the value $4f_i/k$ is substantially equal to the intrinsic normal-ignition exhaust noise frequency $f_o$. The signal waves thus passed through the individual band-pass filters provided in the sampling circuit 54 therefore consist of only the frequencies that fall within the band widths respectively centered at the normal-ignition exhaust noise frequency $f_o$ and the fractional harmonics thereof contained in the exhaust-noise frequency $f_n$ of the signal wave $S_n$ supplied to the sampling circuit 54. The signal waves delivered from the sampling circuit 54 are fed to a holding circuit 56 which is operative to combine the input signal waves into a single composite wave and accumulate the composite wave therein. The holding circuit 56 has an output terminal connected to a low-pass filter 58 so that only the low frequency components of the composite wave delivered from the holding circuit 56 are passed as a misfire signal $Sf$ to the output terminal of the low-pass filter 58.

Figure 9:
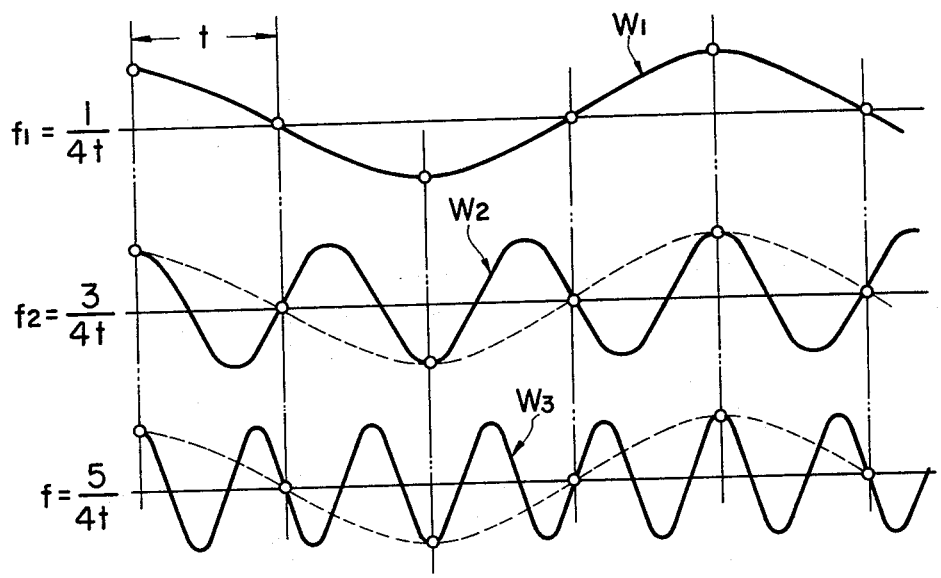
FIG. 9 is a graph showing different sinusoidal waveforms which are sampled for amplitude at predetermined intervals related to the frequencies of the waveforms.
Figure 10:
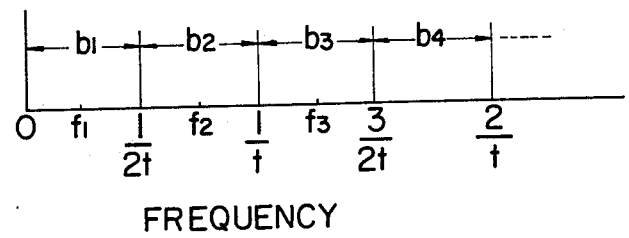
FIG. 10 is a diagram showing frequency bands which contain the frequencies of the waveforms illustrated in FIG. 9.
Figure 11:
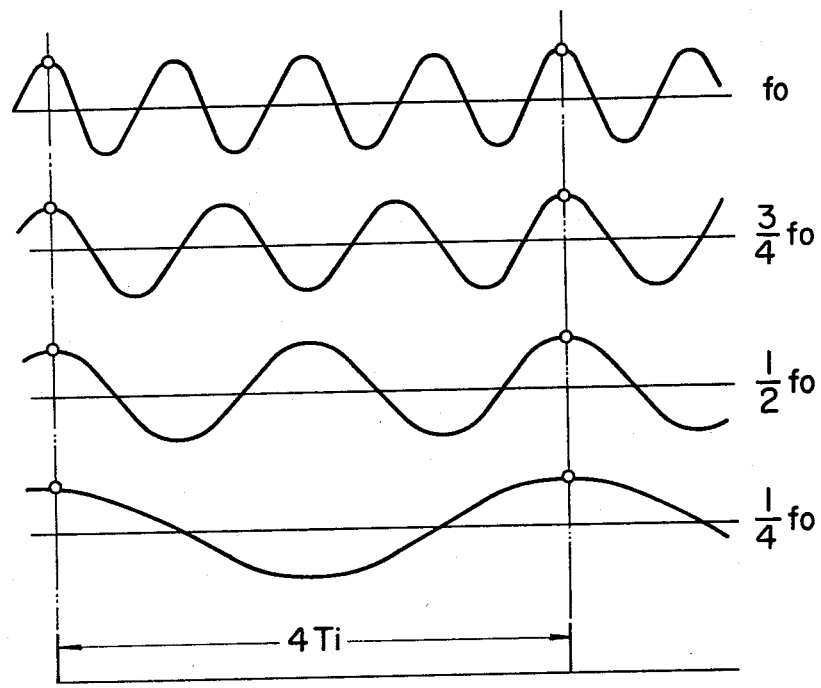
FIG. 11 is a graph which shows sinusoidal waveforms similar to those of FIG. 9 but contained in the wave indicative of exhaust noises which are produced by a four-cylinder internal combustion engine.

FIG. 9 shows sinusoidal waves $W_1$, $W_2$ and $W_3$ having different frequencies $f_1$, $f_2$, and $f_3$ which are fractional harmonics $1/(4t)$, $3/(4t)$ and $5/(4t)$, respectively, of a certain fundamental frequency $1/t$. When the waves $W_1$, $W_2$ and $W_3$ are sampled for amplitude at intervals $t$, the amplitudes of the waves assume the same values at each instant at which the waves are simultaneously sampled and, as a consequence, the waves having the different frequencies $f_1$, $f_2$ and $f_3$ appear as if they had equal frequencies. This means that, if the frequencies falling within a series of successive frequency bands $b_1$, $b_2$, $b_3$, ... which have equal band widths $1/(2t)$ and respective center frequencies $f_1, f_2, f_3, \ldots$ are sampled at the above mentioned intervals $t$, the frequency characteristics of all the bands $b_1$, $b_2$, $b_3$, ... will appear to be similar to one another so that all the frequencies of the waves smoothly joining the sampled points of the waves can be contained in one of the bands $b_1$, $b_2$, $b_3$, ... such as the band $b_1$. When a wave having frequency components which are integral multiples of $1/t$ is sampled at the intervals $t$, the particular frequency components can therefore be deemed as a direct current. From this, it is understood that the output signal wave of the low-pass filter 58 of the arrangement illustrated in FIG. 8 contains all the frequency components that are the integral multiples of the value $k \cdot Ti$. FIG. 11 shows examples of the waves having such frequency components as appearing in exhaust noises of a four-cylinder internal combustion engine, wherein the sampling intervals $t$ are assumed to be $4Ti$.

Figure 12:
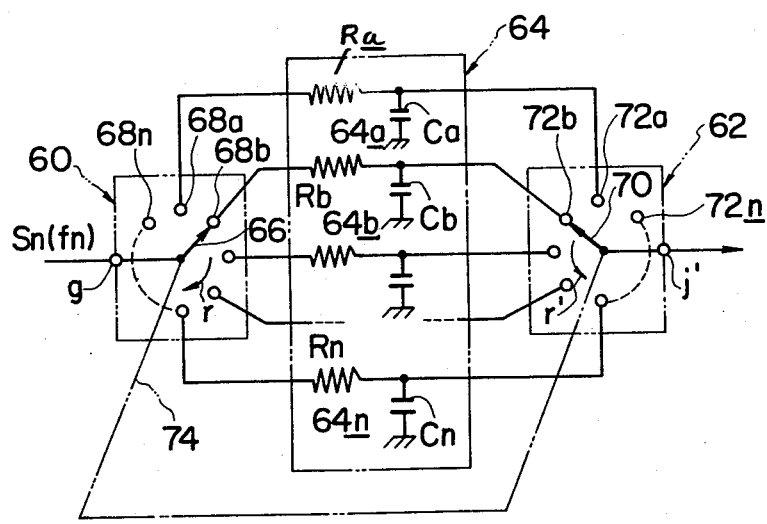
FIG. 12 is a schematic circuit diagram showing still another preferred example of the frequency analyzing means forming part of the misfire detecting system illustrated in FIG. 4.

FIG. 12 illustrates still another example of the frequency analyzer forming part of the misfire detecting system shown in FIG. 4. The frequency analyzer herein shown comprises multiple-contact first and second rotary switch units 60 and 62 and a low-pass filter assembly 64. The first rotary switch unit 60 comprises a rotary contact element 66 rotatable about a fixed axis and electrically connected through the input terminal $g$ to the earphone receiver 34 shown in FIG. 4. To the rotary contact element 66 is thus continuously fed to the signal wave $Sn$ having the exhaust-noise frequency $f_n$. The first rotary switch unit 60 further comprises a plurality of stationary contact elements $68a$, $68b$, ... $68n$ which are equal in number to the power cylinders of the internal combustion engine to which the embodiment of FIG. 12 is to be applied. The stationary contacts $68a$, $68b$, ... $68n$ are located on a circle having the center at the axis of rotation of the rotary contact element 66 and are substantially equiangularly spaced apart from one another about the axis of rotation of the contact element 66. The rotary contact element 66 rotatable in a direction of arrow $r$ about its axis of rotation. The second rotary switch unit 62 is, in itself, constructed similarly to the first rotary switch unit 60, comprising a rotary contact element 70 rotatable about a fixed axis in the direction of arrow $r'$ and electrically connected to an output terminal $j'$, and a plurality of stationary contact elements $72a$, $72b$, ... $72n$ which are substantially equiangularly spaced apart from one another in a circle having the center at the axis of rotation of the rotary contact element 70. The respective rotary contact elements 66 and 72 of the first and second rotary switch units 60 and 62 are connected together by a suitable mechanical linkage 74. The mechanical linkage 74 is operatively connected to the crankshaft (not shown) of the engine so that the respective rotary contact elements 66 and 70 of the first and second rotary switch units 60 and 62 are concurrently rotated about their respective axes of rotation at a velocity which is proportional to the output speed of the engine. When the engine is in operation the rotary contact element 66 is electrically connected successively to the stationary contact elements 68a, 68b, . . . 68n in the first rotary switch unit 60 and at the time the rotary contact element 70 is electrically connected successively to the stationary contact elements 72a, 72b, . . . 72n in the second rotary switch unit 62 at intervals which are proportional to the output speed of the engine. Thus, the mechanical linkage 74 forms part of means alternative to the engine-speed responsive frequency generator 44 of the arrangement of FIG. 4. On the other hand, the low-pass filter assembly 64 comprises a plurality of low-pass filters 64a, 64b, . . . 64n each consisting of a combination of a resistor and a capacitor which are indicated by R and C with subscripts a, b, . . . n affixed thereto for the individual low-pass filters 64a, 64b, . . . 64n, respectively. The stationary contact elements 68a, 68b, . . . 68n of the first rotary switch unit 60 are respectively connected through these low-pass filters 64a, 64b, . . . 64n to the stationary contact elements 72a, 72b, . . . 72n of the second rotary switch unit 62. The output terminal j' of the second rotary switch unit 62 is electrically connected to a suitable control circuit (not shown) which is adapted to detect misfiring condition from the signal waves which are to appear at the terminal j', as will be understood as the description proceeds.

The individual low-pass filters 64a, 64b, . . . 64n are constructed and arranged so that the cut-off frequencies thereof are lower in this sequence with the cut-off frequency of the last filter 64n set at zero. When the rotary contact elements 66 and 70 are driven to rotate about their respective axes and successively scan the respectively associated stationary contact elements 68a, 68b, . . . 68n and 72a, 72b, . . . 72n, at a velocity proportional to the output speed of the engine, then a succession of discrete waves appear at the output terminal j' of the second rotary switch unit 62 at intervals which are dictated by the velocity of rotation of the rotary contact elements 66 and 70. In this instance, the pulses appearing at the output terminal j' of the second rotary switch unit 62 have amplitudes which stepwise diminish as the rotary contact elements 66 and 70 scan the respectively associated stationary contact elements from the contact elements 68a and 70a toward the contact elements 68n and 70n, respectively, because of the above described performance characteristics of the individual low-pass filters 64a, 64b, . . . 64n. If the rotational velocity of the rotary contact elements 66 and 70 of the switch units 60 and 62 is selected so that each rotary contact element makes a full turn per period of time $T_r$, the respective center frequencies of the band widths of the waves appearing at the output terminal j' of the second rotary switch unit 62 become $i/T_r$ wherein $i$ is an integer starting at zero. It therefore follows that, if the stationary contact elements of each of the switch units 60 and 62 are equal in number to the cylinders of the engine and if, furthermore, the above mentioned period of time $T_r$ of the cycle of rotation of each of the rotary contact elements 66 and 70 of the switch units 60 and 62 is selected as the product of the number of the engine cylinders and the period of time of the firing cycle produced by the ignition system of the engine (either in a two-stroke cycle engine or in a four-stroke cycle engine), the previously described normal-ignition exhaust noise frequency $f_o$ initially contained in the signal wave Sn appearing at the input terminal g of the first rotary switch unit 60 is not passed over to the output terminal j' of the second rotary switch unit 62. Only the fractional harmonic components of the frequency $f_o$ are thus allowed to pass from the input terminal g to the output terminal j'. A misfiring condition brought about in the engine can therefore be easily detected by monitoring the waves appearing at the output terminal j' of the second rotary switch unit 62.

While the present invention has been hereinbefore described as being applied to a spark-ignition internal combustion having an exhaust cleaning catalytic converter in the exhaust system of the engine, it is apparent that the basic concept of the method and system according to the present invention can be realized in any types of spark-ignition internal combustion engines which are not equipped with such converters.

What is claimed is:

1. A method of detecting misfiring condition of a spark-ignition internal combustion engine, comprising sensing the exhaust noises of the engine and producing a continuous signal wave having an exhaust-noise frequency variable as a function of and in correspondence with the detected exhaust noises, the signal wave having a frequency spectrum having peak values one of which appears at a fundamental frequency component of the wave irrespective of firing conditions in the engine and the others of which appear at certain fractional harmonics of the fundamental frequency component when a misfire takes place in the engine, detecting the output speed of the engine and producing an engine-speed signal variable with the detected engine output speed, and analyzing said signal wave with respect to the fundamental frequency component of the wave and said fractional harmonics on the basis of said engine-speed signal for detecting existence of a misfiring condition, if any, of the engine from the relationship between the respective spectrum amplitudes of the frequency spectrum of the signal wave at the fundamental frequency component and the fractional harmonics thereof.

2. A method as set forth in claim 1, in which said signal wave has a fundamental frequency band having a center frequency at said fundamental frequency component and low-frequency bands having respective center frequencies at said fractional harmonics, varying the respective center frequencies of all the bands in accordance with said engine-speed signal, and monitoring the respective spectrum density levels of said low-frequency bands with respect to the spectrum density level of said fundamental frequency band.

3. A method as set forth in claim 2, in which said low-frequency bands are monitored with respect to said fundamental frequency band by producing signal waves one of which has the fundamental frequency band and the others of which respectively have the low-frequency bands, combining together the signal waves having the low-frequency bands for producing a single composite signal wave and comprising the spectrum density level of the composite signal wave with the spectrum density level of the signal wave having said fundamental frequency band for producing a misfire signal when the former is greater than the latter.

4. A method as set forth in claim 2, in which said low-frequency bands are monitored with respect to said fundamental frequency band by producing a white noise signal wave having a frequency spectrum with a fixed amplitude, producing predetermined basic frequency bands from the white noise signal wave in a number equal to the total number of said fundamental frequency band and said low-frequency bands, the basic frequency bands respectively having predetermined harmonic center frequencies, producing as said engine-speed signal a signal wave having a variable frequency synchronized with the firing frequency in the engine, producing a fractional signal wave having a variable frequency which is equal to a predetermined fraction of the frequency of the engine-speed signal, varying the respective center frequencies of the basic frequency bands in accordance with the frequency of said fractional signal wave for producing said fundamental frequency band and said low-frequency bands respectively from the basic bands, producing signal waves consisting of only those frequency components of the first named signal wave which fall within said fundamental frequency band and said low-frequency bands, combining together said signal waves having the fundamental frequency band and the low-frequency bands for producing a single composite signal wave, and extracting from the composite signal wave those frequency components which are lower than a predetermined limit lower than the lower unit of the fundamental frequency band for producing a misfire signal from the extracted frequency components.

5. A method as set forth in claim 2, in which said low-frequency bands are monitored with respect to said fundamental frequency band by dividing said signal wave into a predetermined number of component waves having different frequency bands, and successively scanning the component waves in cycles having periods of time each equal to the product of the number of the power cylinders of the engine and the period of time of each firing cycle of the engine for extracting only those frequency components of said signal wave which are lower than said fundamental frequency band and producing a misfire signal from the extracted frequency components.

6. A method as set forth in claim 1, in which the total number of said fundamental frequency band and said low-frequency bands equals the number of the power cylinders of the engine.

7. A misfire detecting system for a spark-ignition internal combustion engine, comprising an electroacoustic transducer for sensing the exhaust noises of the engine and producing a continuous signal wave having an exhaust-noise frequency which varies with the detected exhaust noises, the signal wave having a frequency spectrum having peak values one of which appears at a fundamental frequency component of the wave irrespective of firing conditions in the engine and the other of which appears at certain fractional harmonics of the fundamental frequency component when a misfire takes place in the engine, engine-speed detecting means for detecting the output speed of the engine and producing an engine-speed signal which is variable with the detected output speed of the engine, and frequency analyzing means for analyzing said signal wave with respect to the fundamental frequency component of the wave and said fractional harmonics thereof on the basis of said engine-speed signal for thereby detecting misfiring conditions, if any, of the engine from the relationship between the respective amplitudes of the frequency spectrum of the signal wave at said fundamental frequency component and said fractional harmonics.

8. A misfire detecting system as set forth in claim 7, in which said frequency analyzing means is operative to extract from said signal wave a fundamental frequency band having a center frequency at said fundamental frequency component and low-frequency bands having respective center frequencies at said fractional harmonics, varying the respective center frequencies of all the bands in accordance with said engine-speed signal, and monitoring the respective spectrum density levels of the low-frequency bands with respect to the spectrum density level of the fundamental frequency band.

9. A misfire detecting system as set forth in claim 8, in which said frequency analyzing means comprises a plurality of band-pass filters one of which has said fundamental frequency band and the others of which have said low-frequency bands, respectively, each of said band-pass filters having an input terminal connected to said electroacoustic transducer for being supplied with said signal wave and an input terminal connected to said engine-speed detecting means, the engine speed detecting means being operative to produce as said engine-speed signal a continuous signal wave having a frequency variable with the output speed of the engine, a mixer having input terminals connected in parallel to the output terminals of the band-pass filters having said low-frequency bands for combining together the signal waves delivered from the band-pass filter with the low-frequency bands and producing a single composite signal wave and a comparator having an input terminal connected to the output terminal of the band-pass filter having said fundamental frequency band and an input terminal connected to the output terminal of said mixer for comparing the spectrum density level of said composite signal wave with the spectrum density level of the signal wave delivered from said band-pass filter having said fundamental frequency band and producing a misfire signal when the former is greater than the latter.

10. A misfire detecting system as set forth in claim 9, in which said band-pass filters are equal in number to the number of power cylinders of the engine.

11. A misfire detecting system as set forth in claim 9, in which said frequency analyzing means comprising a frequency divider having an input terminal connected to said engine-speed detecting means, the engine-speed detecting means being operative to produce as said engine-speed signal a continuous signal wave having a variable frequency which is synchronized with the firing frequency in the engine, said frequency divider being operative to produce a fractional signal wave having a variable frequency which is equal to a predetermined fraction of the frequency of the signal wave fed to the divider from said engine-speed detecting means, a sampling circuit operative to produce a white noise signal wave having a frequency spectrum with a fixed amplitude and to produce predetermined basic frequency bands from said white noise signal wave in a number which is equal to the total number of said fundamental frequency band and said low-frequency bands, said basic frequency bands respectively having predetermined harmonic center frequencies, said sampling circuit having an input terminal connected to the output terminal of said frequency divider for varying the respective center frequencies of said basic frequency bands in accordance with the frequency of said fractional signal wave for producing said fundamental frequency band and said low-frequency bands respectively from said basic bands, said sampling circuit having another input terminal connected to said electroacoustic transducer for being supplied with said signal wave delivered therefrom and delivering signal waves consisting of only the frequency components falling within said fundamental frequency band and said low-frequency bands, a holding circuit having an input terminal connected to said sampling circuit for combining together said signal waves delivered from the sampling circuit and accumulating the signal waves therein for producing a single composite signal wave, and a low-pass filter having an input terminal connected to said holding circuit for extracting from said composite signal wave those frequency components which are lower than the cut-off frequency of the low-pass filter.

12. A misfire detecting system as set forth in claim 9, in which said frequency analyzing means comprises a pair of rotary switch units each having a rotary contact element rotatable about a fixed axis of rotation and a plurality of stationary contact elements which are equiangularly spaced apart from one another about said fixed axis and which are equal in number to the power cylinders of the engine, the rotary contact element of each of said switch units being operative to successively scan the individual stationary contact elements of the switch unit, the rotary contact element of one of the switch units being electrically connected to said electroacoustic transducer, and low-pass filters equal in number to the stationary contact elements of each of said switch units and each connected between one of the stationary contact elements of one of said switch units and one of the stationary contact elements of the other switch unit, the low-pass filters having respective cut-off frequencies which are different from one another, said engine-speed detecting means comprising a mechanical linkage operatively connecting the rotary contact elements of said switch units jointly to the output shaft of the engine for driving the rotary contact elements to concurrently rotate about their respective axes of rotation at a velocity at which each of the rotary contact elements makes a full turn in a cycle having a period of time equal to the product of the number of the power cylinders and the period of time of each of the firing cycles in the engine.

* * * * *